Patented Oct. 31, 1922.

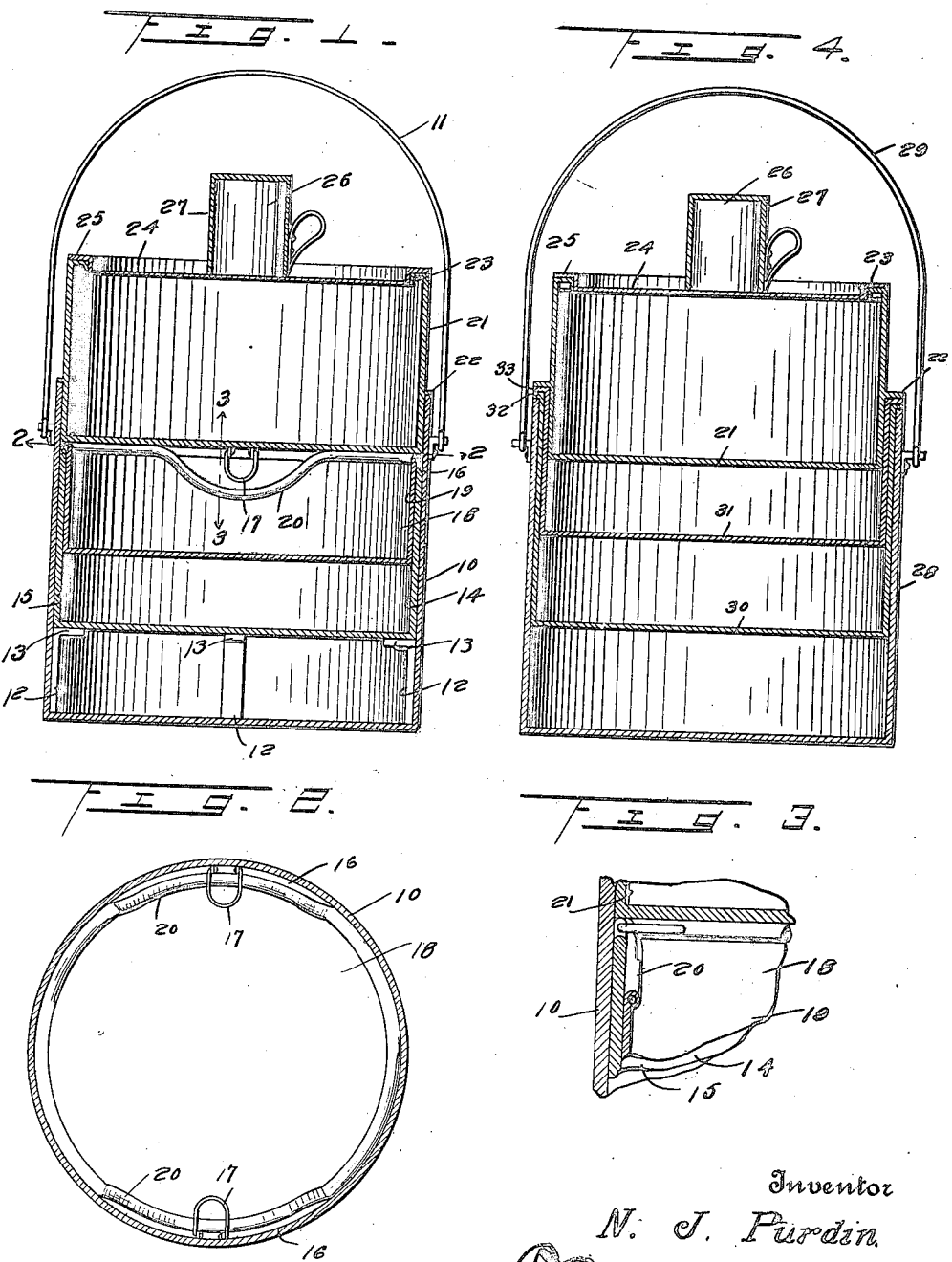

1,434,149

UNITED STATES PATENT OFFICE.

NETTIE JANE PURDIN, OF TECUMSEH, OKLAHOMA, ASSIGNOR OF ONE-FOURTH TO OTIS B. WEST, OF TECUMSEH, OKLAHOMA.

DINNER PAIL.

Application filed May 14, 1919. Serial No. 297,045.

*To all whom it may concern:*

Be it known that I, NETTIE JANE PURDIN, a citizen of the United States, residing at Tecumseh, in the county of Pottawatomie and State of Oklahoma, have invented certain new and useful Improvements in Dinner Pails; and I do hereby declare the following to be a full, clear, and exact description of the invention, such as will enable others skilled in the art to which it appertains to make and use the same.

My invention relates to improvements in receptacles and more particularly to dinner pails.

An important object of this invention is to provide a dinner pail or bucket having a plurality of interfitting receptacles adapted for the reception of different foods.

A further object of this invention is to provide a dinner pail having a novelly constructed coffee receptacle provided on its top with means for supporting a coffee cup.

A further object of this invention is to provide a dinner pail which is neat, sanitary and of highly simplified construction.

Other objects and advantages of this invention will be apparent during the course of the following description.

In the accompanying drawing forming a part of this application, and in which like numerals are employed to designate like parts throughout the same, Figure 1 is a vertical section through a dinner pail embodying my invention, Figure 2 is a horizontal section taken on line 2—2 of Figure 1, Figure 3 is a vertical detail section taken on line 3—3 of Figure 1, and, Figure 4 is a vertical section through a slightly modified form of the invention.

In the drawing wherein for the purpose of illustration is shown the preferred embodiment of my invention, the numeral 10 designates a cylindrical body having a bail 11 attached thereto. As illustrated in Figure 1 a plurality of standards 12 are arranged within the body 10 and are provided with horizontal portions 13 upon which rest a cylindrical receptacle 14, including a side wall 15 constructed of suitable material having its upper edge rolled as at 16 and in engagement with the inner side of the body 10 thereby retaining the same in a set position. Lifting loops 17 are horizontally pivoted to the upper edge of the receptacle 14 and are adapted to be engaged for lifting the receptacle out of the body.

An interfitting cylindrical tray 18 is disposed in the upper portion of the receptacle 14 and is provided with a cylindrical side wall 19 having its upper edge curved and engaging the bead 16 of the receptacle 14 for supporting the tray. As illustrated the tray 18 fits snugly within the receptacle 14 and is thereby prevented from accidental displacement.

The upper portion of the cylindrical side 19 of the tray 18 is provided with recesses 20 to permit of the inward folding of the rings or loops 17. A coffee receptacle 21 is removably fitted within the upper portion of the body 10 and has its sides in snug engagement with the inner side of the body 10. An annular flange 22 is carried by the coffee receptacle 21 and abuts the top of the body 10. The annular flange 22 is arranged intermediate the upper and lower ends of the coffee receptacle and thereby retain a portion of the receptacle above the intermediate receptacle. The upper side of the receptacle 21 is open and is provided with an inwardly extending annular flange 23 which as illustrated is L-shaped in cross section. A cover 24 is provided with an annular flange 25 which is L-shaped in cross section and adapted to snugly engage the inwardly extending flange 23 for securely retaining the cover in position.

A cylindrical support 26 is secured to the top of the cover 24 centrally thereof and is adapted to form a support for a coffee cup 27. The coffee cup has snug engagement with the cylindrical support 26 and is arranged in an inverted position thereby preventing the access of dust and germs into the cup. The upper edge of the cup engages the top of the closure 24 snugly.

In the form of my invention illustrated in Figure 4 a body 28 is provided with a bail 29 of any desired construction. Interfitting receptacles 30 and 31 are arranged within the body 28 and are provided with outwardly extending abutting annular flanges 32 and 33. The bottom of each receptacle is arranged in superposed relation and is spaced for a substantial distance thereby permitting substantial quantities of food carried in the receptacle. The coffee receptacle 21 is adapted to be received within the upper receptacle 31 and the flange 22 thereof engaged with the flange 33.

In the use of my invention it will be apparent that the interfitting receptacles may be readily arranged within the body and readily removed for the purpose of affording access to the food within the receptacle.

While I have shown and described the preferred embodiment of my invention, it is understood that I may make such minor changes in arrangement and construction of parts as will remain within the spirit of the invention and the scope of the appended claim.

Having thus described my invention, what I claim is:—

A dinner pail having a bucket, a tray of less height than the bucket disposable therein, a tray disposable in said tray having a flange to rest on the upper edge of the first mentioned tray, a tray partly disposable in said bucket to rest on said flange, inwardly foldable handle means on the first mentioned tray adjacent its upper edge, and the second mentioned tray being recessed at its upper edge to accommodate compact disposition of said handle means below the third mentioned tray.

In testimony whereof I affix my signature in presence of two witnesses.

NETTIE JANE PURDIN.

Witnesses:
C. A. BEGEY,
C. E. PURDIN.